United States Patent
Akimoto

(10) Patent No.: US 9,264,576 B2
(45) Date of Patent: Feb. 16, 2016

(54) COMMUNICATING APPARATUS, CONTROL METHOD THEREFOR, AND STORAGE MEDIUM STORING PROGRAM

(71) Applicant: CANON KABUSHIKI KAISHA, Tokyo (JP)

(72) Inventor: Naoto Akimoto, Chigasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/631,991

(22) Filed: Feb. 26, 2015

(65) Prior Publication Data
US 2015/0256711 A1 Sep. 10, 2015

(30) Foreign Application Priority Data
Mar. 4, 2014 (JP) ................................. 2014-041939

(51) Int. Cl.
*H04N 1/327* (2006.01)

(52) U.S. Cl.
CPC ....... *H04N 1/32732* (2013.01); *H04N 1/32717* (2013.01); *H04N 1/32795* (2013.01)

(58) Field of Classification Search
CPC .......... H04N 1/32732; H04N 1/32795; H04N 1/32717; H04N 1/19; H04N 1/32736

USPC ............ 358/1.13, 1.15, 443, 468; 379/70, 80, 379/88.13, 902
See application file for complete search history.

(56) References Cited

U.S. PATENT DOCUMENTS

| 4,939,772 A | * | 7/1990 | Goto | H04N 1/32704 379/100.16 |
|---|---|---|---|---|
| 6,278,529 B1 | | 8/2001 | Akimoto | 358/1.9 |
| 6,810,150 B1 | | 10/2004 | Akimoto | 382/232 |

FOREIGN PATENT DOCUMENTS

JP  08-307549  11/1996

* cited by examiner

*Primary Examiner* — Jamares Q Washington
(74) *Attorney, Agent, or Firm* — Fitzpatrick, Cella, Harper & Scinto

(57) ABSTRACT

There are provided a communicating apparatus capable of connecting a message recording device and performing facsimile communication, and a control method for the communicating apparatus. In a mode in which the message recording device responds to an incoming call, if it is detected that an incoming call has disappeared, counting by a repeat incoming call timer starts. If a next incoming call is detected before a time-out of the repeat incoming call timer occurs, counting by a message recording monitoring timer for counting a message recording response time starts. If the message recording device does not capture a line before a time-out of the message recording monitoring timer occurs, and the incoming call has not disappeared, facsimile signal reception processing starts.

11 Claims, 10 Drawing Sheets

FIG. 7

CONNECTED MESSAGE RECORDING DEVICE
DOES NOT RESPOND.
PLEASE CONFIRM SETTINGS.

FIG. 8

RECEPTION MODE SETTING
  AUTOMATIC RECEPTION MODE    FAX/TEL MODE
  [MESSAGE RECORDING MODE]    MANUAL MODE

FIG. 9

MESSAGE RECORDING MONITORING OPERATION
    [ON]        OFF

COMMUNICATING APPARATUS, CONTROL METHOD THEREFOR, AND STORAGE MEDIUM STORING PROGRAM

BACKGROUND OF THE INVENTION

1. Field of the Invention

The present invention relates to a communicating apparatus, a control method therefor, and a storage medium storing a program.

2. Description of the Related Art

A communicating apparatus capable of performing facsimile communication conventionally has a plurality of reception modes, and the user can set an arbitrary reception mode. When an incoming call is received from a public line network, the apparatus changes the operation according to the set reception mode. If, for example, the reception mode has been set to an "automatic reception mode", when an incoming call is received, the apparatus starts facsimile reception. If the reception mode has been set to a "FAX/TEL mode", the apparatus connects the line for the incoming call, automatically determines whether the calling side is a facsimile or telephone, and then responds to the incoming call. Whether the incoming call is received from a facsimile or telephone is determined depending on whether a CNG signal indicating facsimile transmission from the calling side has been sent to the line. The CNG signal is a signal sent at a single frequency of 1100 Hz which has a cycle of 500-ms ON and 3000-ms OFF.

The reception modes include a "message recording mode" which assumes that the apparatus is connected to a message recording device. In the "message recording mode", the line output of the communicating apparatus is connected to the message recording device so as to directly supply an incoming call to the message recording device. The message recording device generally captures the line after ringing a predetermined number of times. On the other hand, the communicating apparatus monitors a signal on the line. When a CNG signal is detected on the line, the communicating apparatus switches the line from the message recording device side to the communicating terminal side to start receiving a facsimile signal. As described above, in the "message recording mode", the message recording device responds to an incoming call from a telephone, and the communicating apparatus responds to an incoming call of a facsimile signal as a facsimile (see Japanese Patent Laid-Open No. 8-307549).

However, the communicating apparatus which operates in the "message recording mode" assumes that the message recording device captures the line, and then monitors the line to determine whether facsimile communication is performed. In this mechanism, if the message recording device does not respond to an incoming call for some reason (for example, the user forgot to set the message recording device in the message recording mode), the following problems arise.

The line is not captured unless the message recording device responds to an incoming call, and thus the communicating apparatus does not monitor a CNG signal on the line. Even if, therefore, an incoming call of a facsimile signal is received, reception of the facsimile signal is not recognized, thereby disabling a facsimile reception operation.

SUMMARY OF THE INVENTION

An aspect of the present invention is to eliminate the above-mentioned problems with the conventional technology.

The present invention provides a technique of making it possible to receive a facsimile signal even if a message recording device connected to a communicating apparatus does not respond to an incoming call.

The present invention in one aspect provides a communicating apparatus capable of connecting a message recording device and performing facsimile communication, comprising: a detection unit configured to detect an incoming call and detect that the incoming call has disappeared; a start unit configured to, in a mode in which the message recording device responds to an incoming call, start counting by a repeat incoming call timer in a case where the detection unit detects that the incoming call has disappeared, and start counting by a message recording monitoring timer for counting a message recording response time in a case where the detection unit detects a next incoming call before a time-out of the repeat incoming call timer occurs; and a control unit configured to control to start facsimile signal reception processing in a case where the message recording device does not capture a line before a time-out of the message recording monitoring timer started by the start unit occurs, and the incoming call detected by the detection unit has not disappeared.

According to the present invention, even if a message recording device connected to a communicating apparatus does not respond to an incoming call, it is possible to receive a facsimile signal.

Further features of the present invention will become apparent from the following description of exemplary embodiments with reference to the attached drawings.

BRIEF DESCRIPTION OF THE DRAWINGS

FIG. 7 is a view showing an example of a warning message displayed on a display unit in the MFP;

FIG. 8 is a view showing an example of a setting screen displayed on the display unit when setting a reception mode in the MFP;

FIG. 9 is a view showing an example of a screen displayed on the display unit when setting a message recording monitoring operation in the MFP;

DESCRIPTION OF THE EMBODIMENTS

Figure 1:
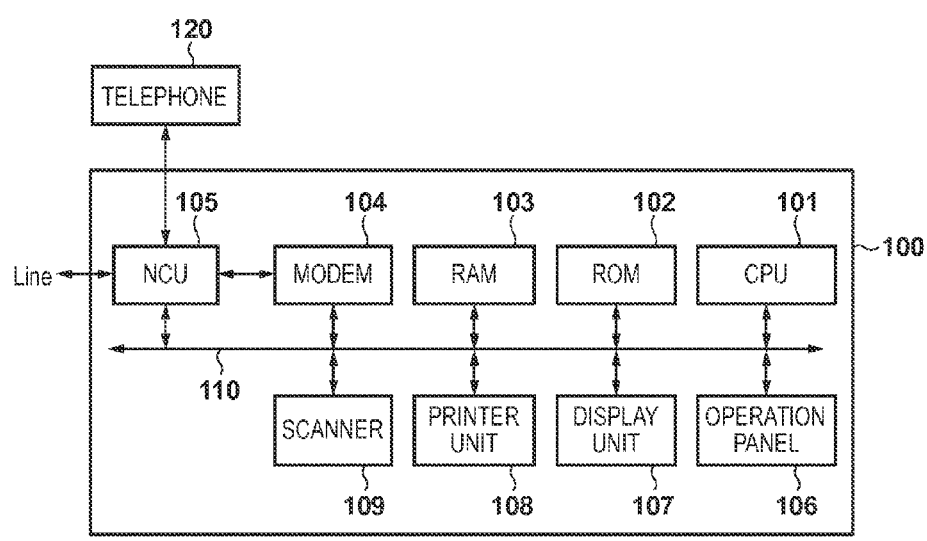
FIG. 1 is a block diagram showing the hardware arrangement of an MFP.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same components and a description thereof will be omitted. Note that in an embodiment, an MFP (Multi Function Peripheral) will be exemplified as an embodiment of a communicating terminal apparatus according to the present invention.

FIG. 1 is a block diagram showing the hardware arrangement of an MFP 100 according to the embodiment of the present invention.

The MFP 100 includes a CPU 101, a ROM 102, a RAM 103, a modem 104, an NCU (Network Control Unit) 105, an operation panel 106, and a display unit 107. The MFP 100 also includes a printer unit 108 and a scanner 109. The MFP 100 is connected to a public line via the NCU 105, and is also connected to a telephone 120. A general telephone is used as the telephone 120 which can originate and terminate a call. A message recording device can be connected to the telephone 120 to operate a message recording function. In this embodiment, a case in which the MFP operates in the message recording mode by connecting a message recording device to the telephone 120 will be described.

The CPU 101 comprehensively controls respective devices connected to a system bus 110, and executes firmware modules stored in the ROM 102. Note that at least two firmware modules are stored, and can be updated independently. The CPU 101 executes processes shown in respective flowcharts (to be described later) based on the firmware modules as control programs. The RAM 103 functions as a main memory and work memory for the CPU 101, and also functions as a backup memory for saving various settings of the apparatus. Under the control of the CPU 101, the modem 104 converts digital data into a voice signal so as to transmit a facsimile signal, and also converts a received voice signal into digital data.

The NCU 105 is a network control unit which switches a line connected to the public line under the control of the CPU 101, and detects whether the telephone 120 has captured the line while the public line and the telephone 120 are connected to each other. Connection to the public line is performed by connecting the public line and the telephone 120 or directly connecting the public line to the control unit of the MFP 100 to disconnect the telephone 120. After the telephone 120 captures the line, the NCU 105 can detect a signal such as a CNG signal on the line. Furthermore, if the MFP is connected to a caller ID display line, the NCU 105 can detect a CAR signal, and also detect telephone number information notified from the line later.

The operation panel 106 is an operation unit for inputting an instruction from the user, and includes the display unit 107, a power key, a ten-key pad, a one-touch key, a start key, a stop key, set key, various setting keys, and an LED. The display unit 107 is arranged in the operation panel 106, and communicates information by displaying a message to the user under the control of the CPU 101. In a screen for deciding various settings and an operation of the MFP, a plurality of settings and a plurality of operations are displayed to the user, thereby prompting the user to make a selection or issue an instruction.

The printer unit 108 forms (prints) an image on a printing paper (sheet) using, for example, an electrophotographic method. The scanner 109 reads an image printed on a printing paper (or document). The scanner 109 incorporates an optional auto document feeder (not shown), and can sequentially convey a plurality of documents and automatically read them.

Figure 2:
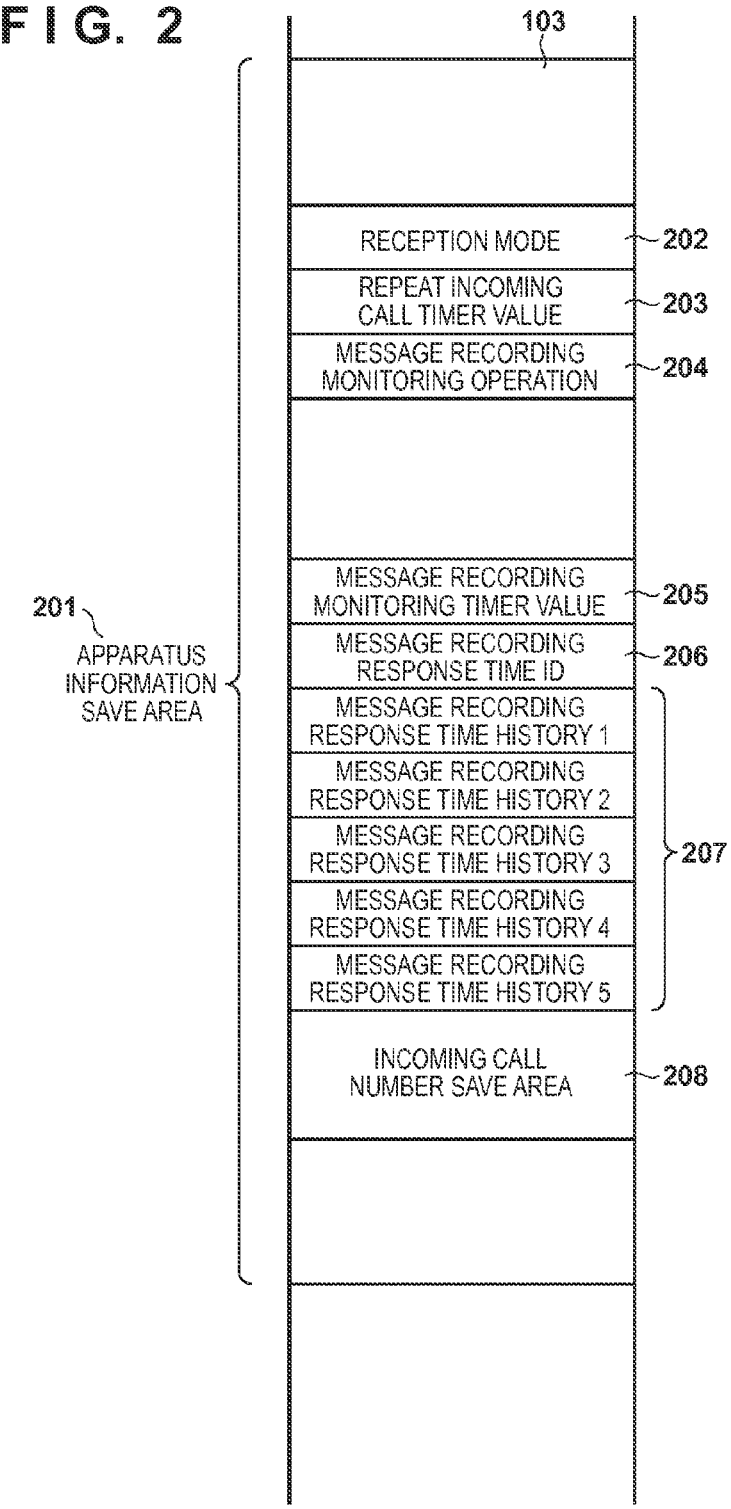
FIG. 2 is a view showing the structure of apparatus information stored in the RAM of the MFP.

FIG. 2 is a view for explaining the structure of apparatus information stored in the RAM 103 of the MFP 100 according to the embodiment.

The RAM 103 according to the embodiment has an apparatus information save area 201 in which information necessary for the operation of the MFP 100 is saved. Pieces of information about a reception mode 202, a repeat incoming call timer value 203, and a message recording monitoring operation 204 are saved in the apparatus information save area 201.

The reception mode 202 indicates an area for saving a reception mode setting which decides an operation to be performed for an incoming call from the public line. The reception mode 202 stores a value indicating one of a "automatic reception mode", "FAX/TEL mode", "message recording mode", and "manual mode". In the "automatic reception mode", facsimile reception processing starts whenever an incoming call is received. In the "FAX/TEL mode", the apparatus responds to an incoming call by determining whether the incoming call is received from a telephone or facsimile after capturing the line. In the "message recording mode", after the message recording device is connected and responds to an incoming call, facsimile reception processing starts if the incoming call is a facsimile incoming call. In the "manual mode", the apparatus always waits for the telephone 120 to respond, and no facsimile reception processing operates. The reception mode 202 saves a mode designated and set by the user via the display unit 107 of the operation panel 106.

FIG. 8 is a view showing an example of a setting screen displayed on the display unit 107 when setting the reception mode 202 in the MFP 100 according to the embodiment.

When the operation panel 106 is operated to select a setting of the reception mode 202, the screen shown in FIG. 8 is displayed on the display unit 107. Referring to FIG. 8, the currently selected mode is highlighted. In FIG. 8, the message recording mode is currently selected. In this state, if the set key (not shown) of the operation panel 106 is pressed, the "message recording mode" is saved in the reception mode 202 of the RAM 103. Note that in the screen shown in FIG. 8, the "automatic reception mode", "FAX/TEL mode", and "manual mode" can be set in addition to the "message recording mode".

The repeat incoming call timer value 203 is an area for saving the setting time of a repeat incoming call timer used to determine, when an incoming call is received, whether the incoming call is a repeat incoming call. The repeat incoming call timer starts when an incoming call disappears, and operates for a time saved in the repeat incoming call timer value 203. The fact that the incoming call disappears indicates that the connected message recording device (telephone 120) does not correctly operate. That is, if the incoming call is received from a facsimile, no facsimile reception processing is performed. In this case, a facsimile incoming call is highly likely to be received again within a given time by the redial function of the facsimile transmitter side. To cope with this, the repeat incoming call timer is used to determine whether an incoming call is a repeat incoming call. When an incoming call is received, it is determined whether the incoming call is a repeat incoming call by checking the operation state of the repeat incoming call timer. If it is determined that the incoming call is a repeat incoming call, it is determined that the incoming call is a facsimile incoming call. If the telephone 120 does not correctly respond to the incoming call, facsimile reception processing starts. The repeat incoming call timer value 203 stores 300 sec in this embodiment. However, an arbitrary value may be set via the operation panel 106.

The message recording monitoring operation 204 indicates an area for saving information indicating whether to perform an operation of monitoring the message recording device, which will be described in this embodiment, when the setting of the reception mode 202 indicates the "message recording mode". A value indicating "ON" or "OFF" is stored in this area. If the message recording monitoring operation 204 indicates "ON", the MFP monitors a response from the message recording device (telephone 120) (to be described in this embodiment). If no response is detected before the incoming call disappears, the repeat incoming call timer starts counting. If the incoming call is a repeat incoming call, a forced facsimile reception operation is executed. The message recording monitoring operation 204 saves a setting value which has been designated by the user via the operation panel 106 and the display unit 107 to indicate whether to execute the message recording monitoring operation.

FIG. 9 is a view showing an example of a screen displayed on the display unit 107 when setting the message recording monitoring operation 204 in the MFP 100 according to the embodiment.

When the operation panel 106 is operated to select a setting of the message recording monitoring operation 204, the screen shown in FIG. 9 is displayed on the display unit 107. Referring to FIG. 9, the currently selected setting is highlighted. In FIG. 9, "ON" is currently selected. In this state, if the set key (not shown) of the operation panel 106 is pressed, "ON" is saved in the message recording monitoring operation 204.

A message recording monitoring timer value 205 is an area for saving the setting time of a message recording monitoring timer, during which the message recording monitoring operation is continued. The MFP waits for the message recording device (telephone 120) to respond to an incoming call from the public line for the setting time of the message recording monitoring timer. If the message recording device does not respond during this time, the MFP executes a forced facsimile reception operation. The message recording monitoring timer value 205 is initialized to 35 sec at the time of shipment of the MFP 100. After that, however, a time until the connected message recording device (telephone 120) responds is measured, and a time value is decided based on the measured time and saved. This operation will be described in detail with reference to FIG. 6.

Message recording response time histories 207 are areas each for saving an actually measured time until the message recording device (telephone 120) connected to the MFP 100 responds to an incoming call from the line by capturing the line. In this embodiment, areas 1 to 5 are configured to save five measured values. These areas are periodically used, and the number of the message recording response time history to be used to save a value next is designated by a message recording response time ID 206. In processing of saving a measured time until the message recording device (telephone 120) responds, an ID number is acquired from the message recording response time ID 206, and a measured time is saved in one of the message recording response time histories 207, which corresponds to the ID number. The value in the message recording response time ID 206 is updated by the next ID number (for example, the value is incremented by 1, and if the resultant value exceeds 5, it is set to 1), and saved. At the time of shipment of the MFP 100, "1" is set in the message recording response time ID 206, thereby indicating the first area (message recording response time history 1) of the message recording response time histories 207. At the time of shipment of the MFP 100, "FF (hexadecimal number)" is saved in all the message recording response time histories 207, thereby indicating that there is no effective time information in the areas at the time of shipment.

An incoming call number save area 208 saves a telephone number notified from the partner side at the time of reception of an incoming call. The telephone number is sent from the line if the line subscribes to a caller ID display service. The MFP 100 also recognizes the telephone number, and saves it in the incoming call number save area 208. The saved telephone number is used to determine, for an incoming call in a repeat incoming call waiting state, whether the incoming call is received from the same number as that of the preceding incoming call. Whether a telephone number notification is sent changes depending on the line subscription, and thus a telephone number is optionally used.

Figure 3:
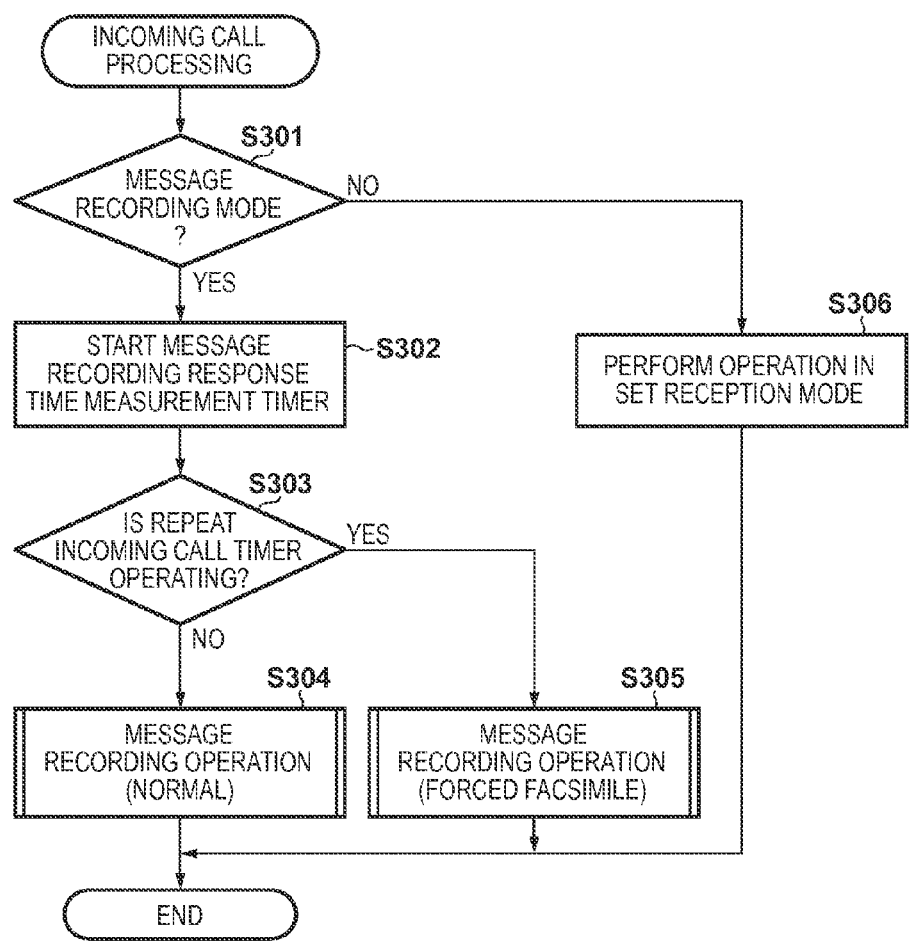
FIG. 3 is a flowchart illustrating incoming call processing by the MFP.

FIG. 3 is a flowchart for explaining incoming call processing by the MFP 100 according to this embodiment. A program for executing the processing is stored in the ROM 102, loaded into the RAM 103 at the time of execution, and executed under the control of the CPU 101, thereby implementing the processing shown in the flowchart.

This processing starts when an incoming call is received from the public line. In step S301, the CPU 101 checks the reception mode 202 stored in the RAM 103, and determines whether the reception mode 202 indicates the "message recording mode". If the reception mode 202 indicates the "message recording mode", the process advances to step S302, and the CPU 101 starts counting by a timer for measuring the response time of the message recording device (telephone 120). The process advances to step S303, and the CPU 101 determines whether the repeat incoming call timer is operating. The repeat incoming call timer starts when the CPU 101 determines that the incoming call has disappeared (to be described later with reference to FIG. 4), and operates for the time saved in the repeat incoming call timer value 203 of the RAM 103. If the CPU 101 determines in step S303 that the repeat incoming call timer is not operating, the process advances to step S304, and the CPU 101 determines that the incoming call is not an incoming call made by retransmitting a facsimile signal by a transmission source, and executes normal processing in the message recording mode. The normal processing in the message recording mode will be described in detail with reference to FIG. 4.

On the other hand, if the CPU 101 determines in step S303 that the repeat incoming call timer is operating, the process advances to step S305, and the CPU 101 determines that the incoming call is an incoming call made by retransmitting a facsimile signal by the transmission source, and executes processing in the message recording mode in which forced facsimile reception processing operates. As described above, if the repeat incoming call timer is operating, the CPU 101 determines that the incoming call is highly likely to be a facsimile incoming call, and can forcibly perform facsimile reception processing even in the operation in the message recording mode. The forced facsimile reception processing will be described in detail with reference to FIG. 5.

On the other hand, if the CPU 101 determines in step S301 that the reception mode 202 does not indicate the "message recording mode", the process advances to step S306, and the CPU 101 executes processing in the reception mode saved in the reception mode 202 of the RAM 103. A detailed description of this processing is irrelevant to a description of the embodiment, and will be omitted.

Figure 4:
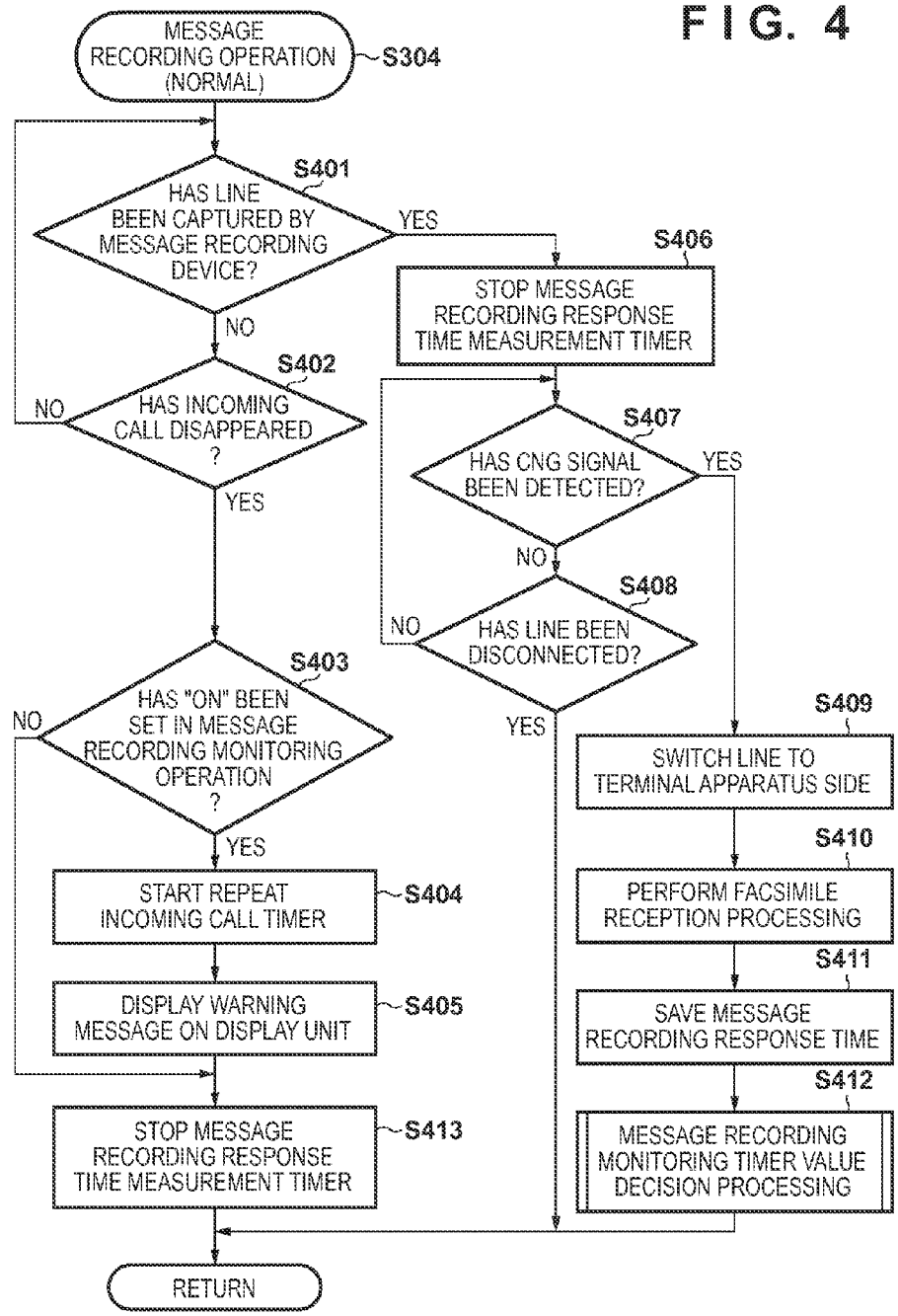
FIG. 4 is a flowchart illustrating a normal message recording operation in step S304 of the incoming call processing by the MFP.

FIG. 4 is a flowchart for explaining the normal message recording operation in step S304 (FIG. 3) of the incoming processing by the MFP 100 according to this embodiment.

In step S401, the CPU 101 monitors, via the NCU 105, the state of the line connecting the public line and the telephone 120, and determines whether the message recording device (telephone 120) has captured the line. If the CPU 101 determines in step S401 that the message recording device (telephone 120) has not captured the line, the process advances to step S402, and the CPU 101 determines whether the incoming call signal from the public line has disappeared. If the CPU 101 determines that the incoming call signal has not disappeared, the process returns to step S401, and the CPU 101 determines again whether the telephone 120 has captured the line.

If the CPU 101 determines in step S402 that the incoming call has disappeared, it is considered that the incoming call has disappeared before the telephone 120 responds to the incoming call from the public line, and it is determined that the telephone 120 is not operating as a message recording device. The CPU 101 advances the process to step S403, and determines whether "ON" has been set in the message recording monitoring operation 204 of the RAM 103. If it is determined that "ON" has been set in the message recording monitoring operation 204, it is indicated that the setting has been made to execute an operation of monitoring the telephone 120 in the "message recording mode". If the CPU 101 determines in step S403 that "ON" has been set in the message recording monitoring operation 204, the process advances to step S404, and the CPU 101 starts counting by the repeat incoming call timer. As a timer value at this time, the setting value stored in the repeat incoming call timer value 203 of the RAM 103 is used. In this way, the CPU 101 starts counting by the repeat incoming call timer. If the next incoming call is received during the operation of the repeat incoming call timer (YES in step S303 of FIG. 3), the process advances to step S305 to forcibly execute facsimile reception processing. With this processing, even in the message recording operation, if the transmission source is a facsimile apparatus, it is possible to forcibly execute facsimile reception processing.

Next, the process advances to step S405, and the CPU 101 displays, on the display unit 107, a message for notifying that the connected message recording device (telephone 120) is not operating. This is done to notify the user of the problem that the message recording device (telephone 120) is not correctly operating so that the user solves the problem. If the message recording device (telephone 120) correctly operates, the problem that facsimile reception processing cannot be performed is also solved.

FIG. 7 is a view showing an example of the warning message which is displayed on the display unit in step S405.

Referring to FIG. 7, information indicating that the connected message recording device does not respond and a message for prompting the user to confirm settings are displayed.

The process advances to step S413, and the CPU 101 stops counting by the timer for measuring the response time of the message recording device, which has started counting in step S302. In this case, since the incoming call has disappeared, the operation in the message recording mode ends without using the counted time.

If the CPU 101 determines in step S403 that "ON" has not been set in the message recording monitoring operation 204, the process advances to step S413, and the CPU 101 stops counting by the timer for measuring the response time of the message recording device, which has started counting in step S302. In this case as well, since the incoming call has disappeared, the operation in the message recording mode ends without using the measured value.

On the other hand, if the CPU 101 determines in step S401 that the message recording device (telephone 120) has captured the line, the process advances to step S406, and the CPU 101 stops counting by the timer for measuring the response time of the message recording device, which has started counting in step S302. The measured timer value at this time is temporarily held in the RAM 103. This value is an actually measured time until the message recording device (telephone 120) captures the line for the incoming call from the public line. The process advances to step S407, and the CPU 101 controls the NCU 105 to determine whether a CNG signal has been detected on the line captured by the telephone 120. The CNG signal is a signal sent at a single frequency of 1100 Hz which has a cycle of 500-ms ON and 3000-ms OFF, and is detected with reference to the frequency and cadence. If the CPU 101 determines in step S407 that no CNG signal has been detected, the process advances to step S408 to determine, via the NCU 105, whether the connection of the line captured by the telephone 120 has been disconnected. If the line connection has not been disconnected, the process returns to step S407, and the CPU 101 determines again whether a CNG signal has been detected. If it is determined in step S408 that the line has been disconnected, it is determined that the incoming call has been made for voice communication, thereby terminating the process without executing any processing.

On the other hand, if the CPU 101 determines in step S407 that a CNG signal has been detected, the process advances to step S409. In this case, since the incoming call is an incoming call of a facsimile signal, the CPU 101 controls the NCU 105 to switch the connection with the public line captured by the telephone 120 to the MFP 100 side (apparatus side). The process advances to step S410, and the CPU 101 controls the modem 104 to send a DIS signal to the public line, and start facsimile signal reception processing according to the ITU-T.30 procedure. Upon completion of the facsimile signal reception processing, the process advances to step S411, and the CPU 101 saves, in one of the message recording response time histories 207 of the RAM 103, the response time of the message recording device measured and held in the RAM 103 in step S406. More specifically, the CPU 101 acquires an ID number from the message recording response time ID 206, saves the response time in one of the message recording response time histories 207, which corresponds to the acquired ID number, and updates and saves the value in the message recording response time ID 206. In this way, it is controlled to save, in each message recording response time history 207, only the response time of the message recording device when a facsimile signal is normally received.

The process advances to step S412, and the CPU 101 performs processing of recalculating and deciding the value in the message recording monitoring timer value 205 of the RAM 103. This processing is performed to update the message recording monitoring timer value 205 using the values in the message recording response time histories 207 since the message recording response time histories 207 have been updated in step S411. This processing will be described in detail with reference to FIG. 6.

Figure 5:
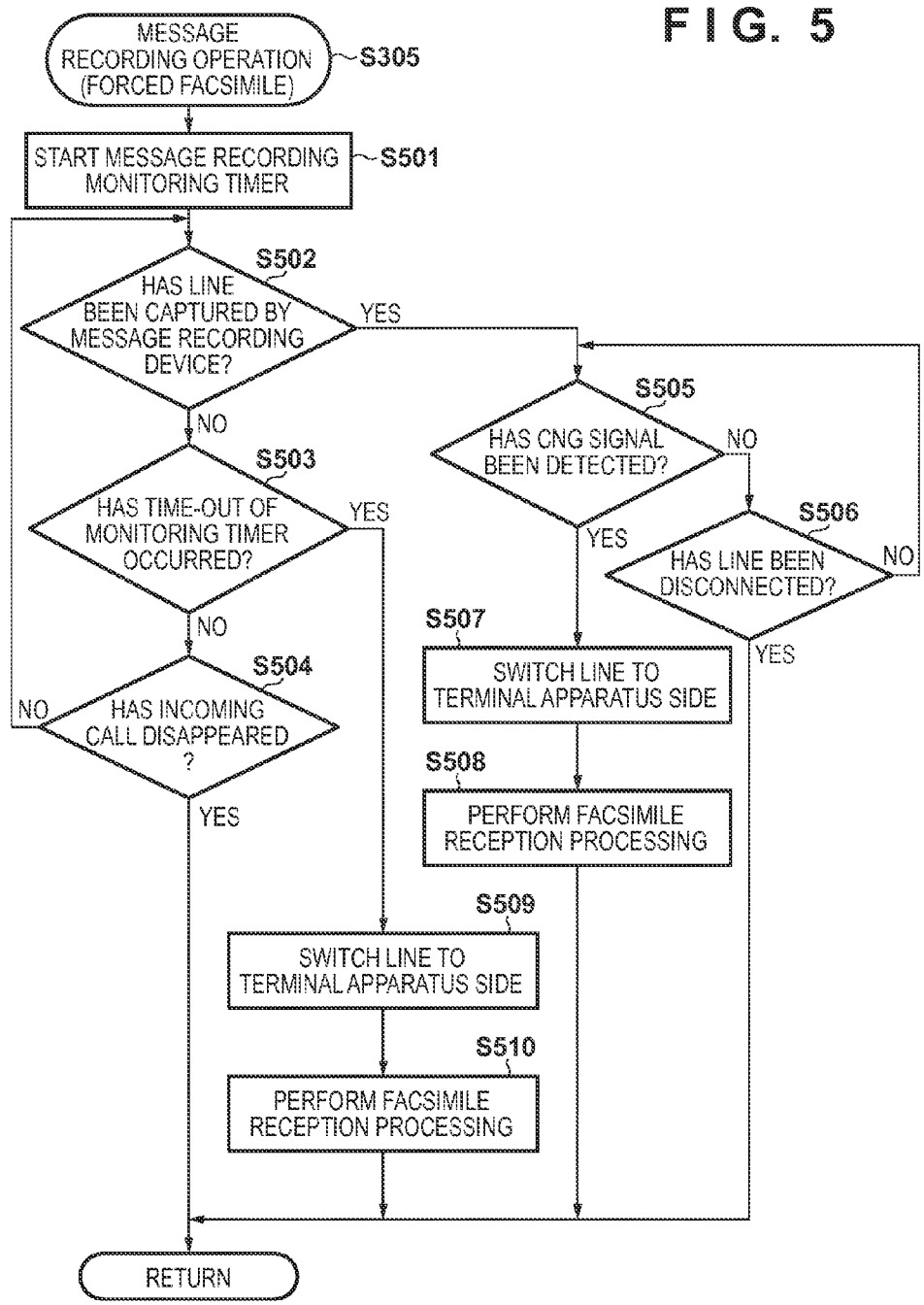
FIG. 5 is a flowchart illustrating message recording operation processing in step S305 in which forced facsimile reception processing operates.

FIG. 5 is a flowchart for explaining the message recording operation processing in step S305 (FIG. 3), in which the forced facsimile reception processing operates, of the incoming call processing by the MFP 100 according to this embodiment.

In step S501, the CPU 101 starts counting by the message recording monitoring timer. As a timer value (counted value) at this time, the value saved in the message recording monitoring timer value 205 of the RAM 103 is used. The message recording monitoring timer value 205 saves the time until facsimile reception processing is forcibly started when the message recording device does not respond. The process advances to step S502, and the CPU 101 determines whether the message recording device (telephone 120) has captured the line, based on a signal from the NCU 105 which monitors the state of the line connecting the public line and the telephone 120. If the CPU 101 determines in step S502 that the message recording device (telephone 120) has not captured the line, the process advances to step S503, and the CPU 101 determines whether a time-out of the message recording monitoring timer which has started counting in step S501 has occurred. If the CPU 101 determines that no time-out of the message recording monitoring timer has occurred, the process advances to step S504, and the CPU 101 determines whether the incoming call signal from the public line has disappeared. If the CPU 101 determines in step S504 that the incoming call signal has not disappeared, the process returns to step S502, and the CPU 101 determines again whether the telephone 120 has captured the line. If the CPU 101 determines in step S504 that the incoming call has disappeared, the operation processing in the message recording mode for the incoming call ends.

On the other hand, if the CPU 101 determines in step S502 that the message recording device (telephone 120) has captured the line, the process advances to step S505, and the CPU 101 controls the NCU 105 to determine whether a CNG signal has been detected on the line captured by the telephone 120. If it is determined in step S505 that no CNG signal has been detected, the process advances to step S506, and the CPU 101 determines, via the NCU 105, whether the connection of the line captured by the telephone 120 has been disconnected. If it is determined that the line connection has not been disconnected, the process returns to step S505, and the CPU 101 determines again whether a CNG signal has been detected. If the CPU 101 determines in step S506 that the line has been disconnected, it is determined that the incoming call has been made for voice communication, thereby terminating the process.

If the CPU 101 determines in step S505 that a CNG signal has been detected, the process advances to step S507. In this case, since the incoming call is an incoming call of a facsimile signal, the CPU 101 controls the NCU 105 to perform processing of switching the connection with the public line captured by the telephone 120 to the MFP 100. The process advances to step S508, and the CPU 101 controls the modem 104 to send a DIS signal to the public line, and start facsimile reception processing according to the ITU-T.30 procedure.

On the other hand, if the CPU 101 determines in step S503 that a time-out of the message recording monitoring timer has occurred, the process advances to step S509. This applies to a case in which the telephone 120 does not capture the line within a waiting time during which the MFP waits for the message recording device (telephone 120) to respond. In this case, since the incoming call is highly likely to be an incoming call made by retransmitting a facsimile signal by a transmission source facsimile apparatus, the CPU 101 forcibly starts facsimile reception processing. That is, in step S509, the CPU 101 controls the NCU 105 to perform processing of switching the connection with the public line captured by the telephone 120 to the MFP 100 side. The process advances to step S510, and the CPU 101 controls the modem 104 to send a DIS signal to the public line, and start facsimile reception processing according to the ITU-T.30 procedure.

With this processing, if the incoming call from the partner is an incoming call of a facsimile signal, it is possible to correctly receive the facsimile signal, thereby terminating the facsimile reception processing. Note that if the incoming call from the partner is a telephone call, no facsimile reception processing is performed. Therefore, facsimile communication ends according to error processing in the ITU-T.30 procedure, thereby terminating the process.

Figure 6:
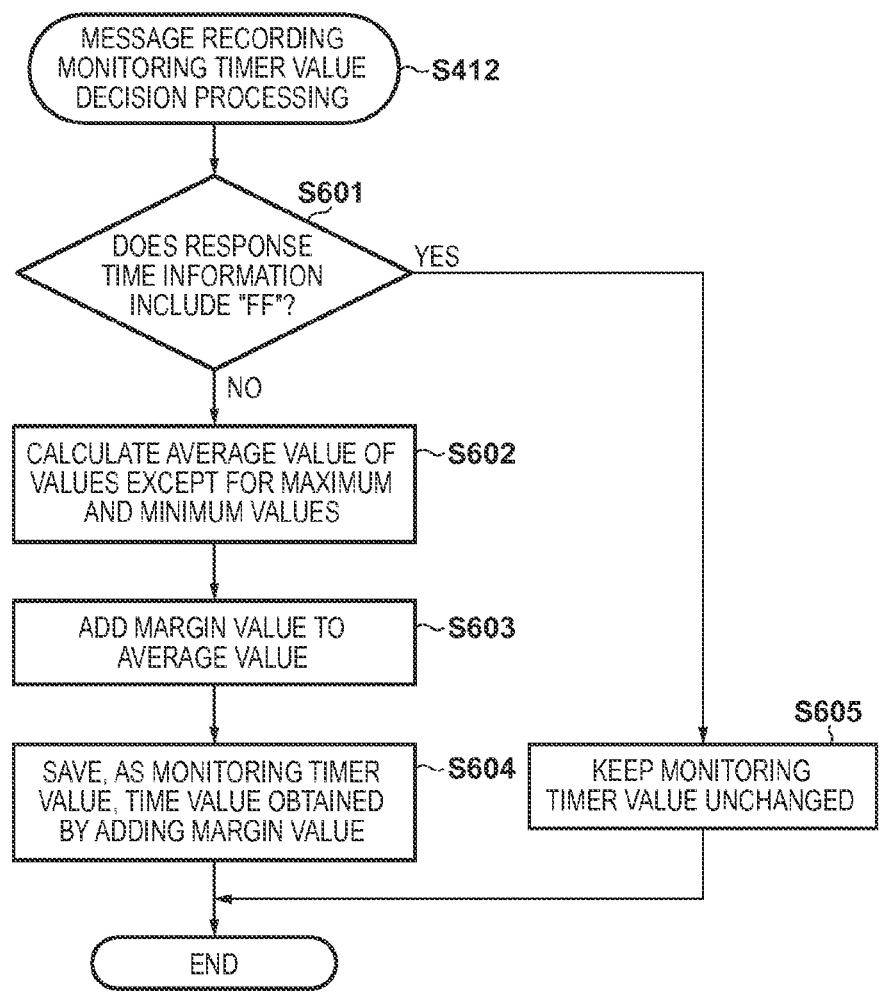
FIG. 6 is a flowchart illustrating processing of deciding a message recording monitoring timer value in step S412.

FIG. 6 is a flowchart for explaining the processing of deciding the message recording monitoring timer value in step S412 of FIG. 4, which is executed by the MFP 100 according to this embodiment.

In step S601, the CPU 101 checks the values saved in the message recording response time histories 207 of the RAM 103, and determines whether the values include "FF". Since all the message recording response time histories 207 are initialized to "FF" at the time of shipment of the MFP 100 as described above, it is determined in step S601 whether all the message recording response time histories 207 save effective measured values. If it is determined in step S601 that the values saved in the message recording response time histories 207 include "FF", the process advances to step S605, and the CPU 101 holds the value in the message recording monitoring timer value 205 of the RAM 103 without updating it. This indicates that no processing of updating the monitoring timer value is performed since the values saved in the message recording response time histories 207 include "FF" and thus it is considered that the MFP 100 has been just shipped from a factory or a sufficient number of examples of the actually measured response time of the connected message recording device have not been acquired.

On the other hand, if the CPU 101 determines in step S601 that the values saved in the message recording response time histories 207 include no "FF", the process advances to step S602, and the CPU 101 calculates the average value of the plurality of values saved in the message recording response time histories 207. At this time, the CPU 101 calculates the average value of the values except for maximum and minimum values. However, the CPU 101 may simply obtain the average value of the values. The process advances to step S603, and the CPU 101 obtains a value by adding a margin value to the average value calculated in step S602. The reason why the margin value is added is as follows. That is, if facsimile reception processing is forcibly operated, the facsimile reception processing is operated later than the time at which the message recording device should originally respond. In this embodiment, the margin value is set to 3 sec. The process advances to step S604, and the CPU 101 saves the time value obtained in step S603 in the message recording monitoring timer value 205 of the RAM 103 as the setting time value of the message recording monitoring timer. The saved time value of the message recording monitoring timer value 205 defines a timing at which an optimized forced facsimile reception operation starts, based on the message recording response operation of the message recording device (telephone 120) connected to the MFP 100.

Figure 10:
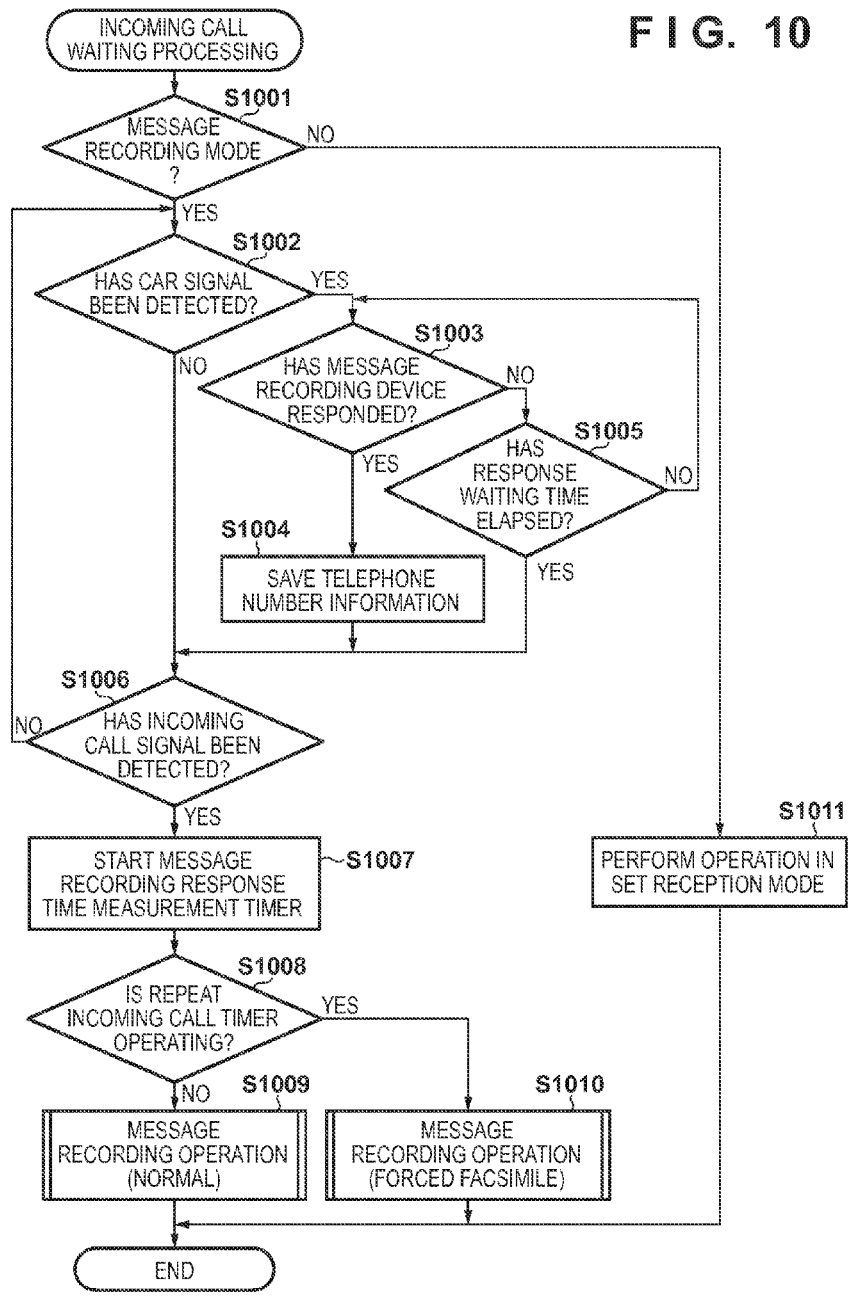
FIG. 10 is a flowchart illustrating incoming call waiting processing when the MFP operates on a caller ID display line.

FIG. 10 is a flowchart for explaining incoming call waiting processing when the MFP 100 operates on the caller ID display line according to this embodiment. A program for executing the processing is stored in the ROM 102, loaded into the RAM 103 at the time of execution, and executed under the control of the CPU 101, thereby implementing the processing shown in the flowchart.

In step S1001, the CPU 101 checks the reception mode 202 stored in the RAM 103, and determines whether the reception mode 202 indicates the "message recording mode". If the CPU 101 determines in step S1001 that the reception mode 202 indicates the "message recording mode", the process advances to step S1002, and the CPU 101 determines whether a CAR signal has been detected on the public line. The CAR signal is an information reception terminal start signal in the caller ID display service, and indicates the start of a number notification sequence. If the CPU 101 determines in step S1002 that a CAR signal has been detected, the process advances to step S1003, and the CPU 101 determines whether the message recording device (telephone 120) has responded to the CAR signal on the public line by forming a DC loop on the line. If it is determined that a response has been detected, the process advances to step S1004, and the CPU 101 acquires telephone number information sent from the public line, and saves it in the temporary save area (not shown) of the RAM 103. The process then advances to step S1006. On the other hand, if the CPU 101 determines in step S1003 that the message recording device (telephone 120) has not responded, the process advances to step S1005, and the CPU 101 determines whether a response waiting time for a CAR signal has elapsed. If the CPU 101 determines that the response wanting time has not elapsed, the process returns to step S1003 to check whether the message recording device (telephone 120) has responded to the public line; otherwise, the CPU 101 stops waiting for a response, and advances the process to step S1006. Note that the message recording device responds to the CAR signal within 6 sec according to the standard.

In step S1006, the CPU 101 determines whether an incoming call signal has been detected from the public line. If the CPU 101 determines in step S1006 that an incoming call signal has been detected, the process advances to step S1007, and the CPU 101 starts counting by a timer to measure the response time of the message recording device (telephone 120). The process advances to step S1008, and the CPU 101 determines whether the repeat incoming call timer is operating. The repeat incoming call timer starts (in step S1104, to be described later with reference to FIG. 11) when the CPU 101 determines that the incoming call has disappeared, and operates for the time saved in the repeat incoming call timer value 203 of the RAM 103. If the CPU 101 determines in step S1008 that the repeat incoming call timer is not operating, the process advances to step S1009 to execute normal message recording operation processing. The normal message recording operation processing will be described in detail later with reference to FIG. 11. On the other hand, if the CPU 101 determines in step S1008 that the repeat incoming call timer is operating, the process advances to step S1010, and the CPU 101 performs message recording operation processing in which forced facsimile reception processing operates. Since an incoming call while the repeat incoming call timer is operating is highly likely to be an incoming call of a facsimile signal, even the operation processing in the message recording mode executes processing in which forced facsimile reception processing operates. The processing in the message recording mode in which forced facsimile reception processing operates will be described in detail later with reference to FIG. 12.

On the other hand, if the CPU 101 determines in step S1001 that the "message recording mode" is not saved, the process advances to step S1011, and the CPU 101 performs processing in the reception mode saved in the reception mode 202 of the RAM 103. A detailed description of the processing is irrelevant to a description of the embodiment, and will be omitted.

Figure 11:
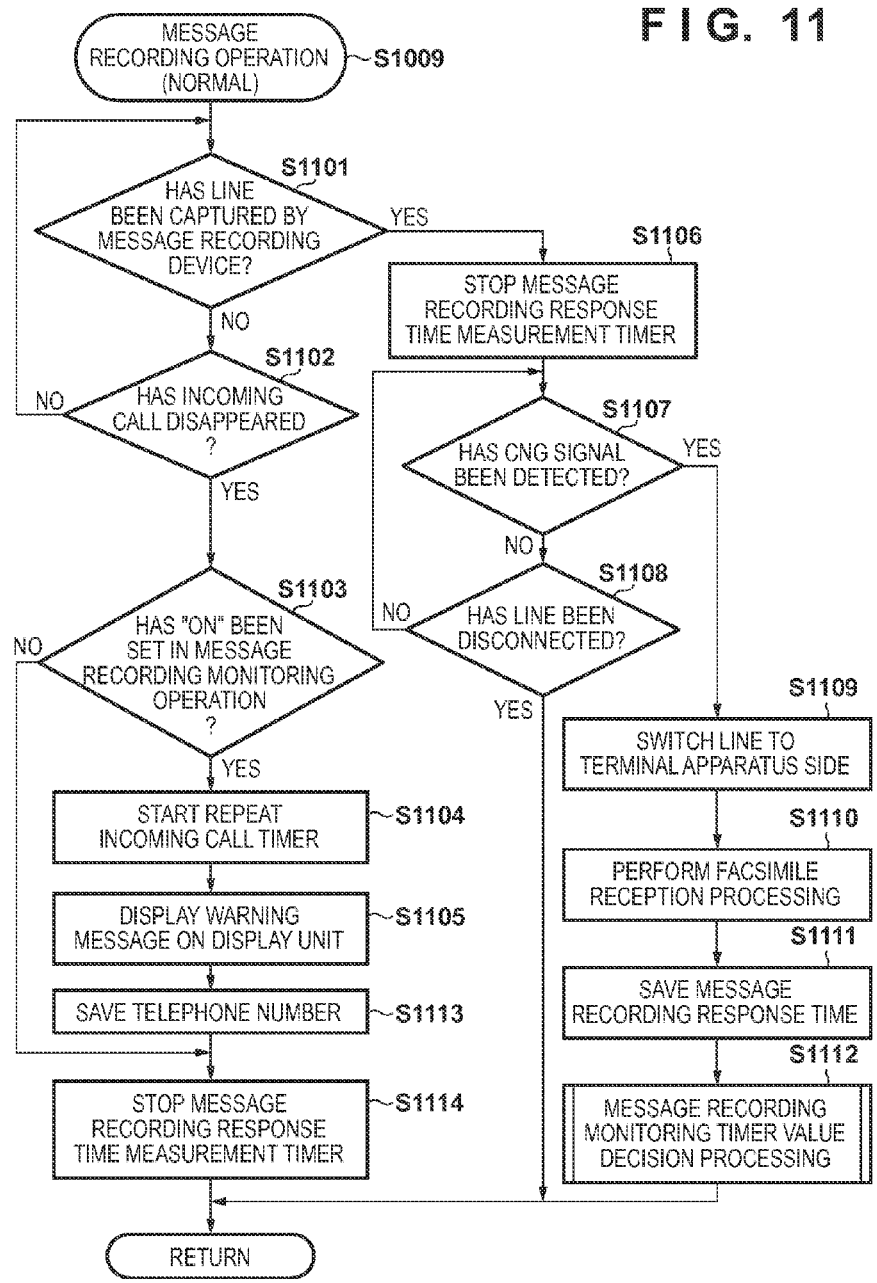
FIG. 11 is a flowchart illustrating a normal message recording operation (step S1009) by the MFP.

FIG. 11 is a flowchart for explaining the normal message recording operation (step S1009 of FIG. 10) by the MFP 100 according to the embodiment.

The CPU 101 monitors, via the NCU 105, the state of the line connecting the public line and the telephone 120, and determines in step S1101 whether the message recording device (telephone 120) has captured the line. If the CPU 101 determines in step S1101 that the message recording device (telephone 120) has not captured the line, the process advances to step S1102, and the CPU 101 determines whether the incoming call signal from the public line has disappeared. If it is determined that the incoming call signal has not disappeared, the process returns to step S1101, and the CPU 101 confirms again whether the telephone 120 has captured the line.

If the CPU 101 determines in step S1102 that the incoming call has disappeared, it is considered that the incoming call has disappeared before the telephone 120 responds to the incoming call from the public line, and it is determined that the telephone 120 is not operating as a message recording device. The process advances to step S1103, and the CPU 101 determines whether "ON" has been set in the message recording monitoring operation 204 stored in the RAM 103, similarly to step S403 of FIG. 4. If it is determined that "ON" has been set in the message recording monitoring operation 204, it is indicated that the setting has been made to monitor a response from the message recording device (telephone 120) and to execute a forced facsimile reception operation if no response is detected. If the CPU 101 determines in step S1103 that "OFF" has been set in the message recording monitoring operation 204, the process advances to step S1114, and the CPU 101 stops counting by the timer for measuring the response time of the message recording device, which has started counting in step S1007, thereby terminating the process.

On the other hand, if the CPU 101 determines in step S1103 that "ON" has been set in the message recording monitoring operation 204, the process advances to step S1104 to start counting by the repeat incoming call timer. As a timer value at this time, the setting value in the repeat incoming call timer value 203 of the RAM 103 is used. In this way, the CPU 101 starts counting by the repeat incoming call timer. If the next incoming call is received during the operation of the repeat incoming call timer (YES in step S1008), the process advances to step S1010, and the CPU 101 can implement message recording operation processing in which facsimile reception processing can be forcibly operated. The process advances to step S1105, and the CPU 101 displays, on the display unit 107, a message (for example, FIG. 7) for notifying that the connected message recording device (telephone 120) is not operating. This is done to notify the user of the problem that the message recording device (telephone 120) is not correctly operating so that the user solves the problem. If the message recording device (telephone 120) correctly operates, the problem that facsimile reception processing cannot be performed is also solved. The above processes are the same as those in steps S403 to S450 of FIG. 4.

The process advances to step S1113, and the CPU 101 saves, in the incoming call number save area 208 of the RAM 103, the telephone number information of the partner apparatus which has been notified from the line and saved in the RAM 103 in step S1004 of FIG. 10. The telephone number information of the partner apparatus is used as the telephone number information of the calling side if the message recording device does not respond. The process advances to step S1114, and the CPU 101 stops counting of the timer for measuring the response time of the message recording device, which has started counting in step S1007. In this case, since the incoming call has disappeared, the measured value at this time is not used. The processing in the message recording mode then ends.

If the CPU 101 determines in step S1101 that the message recording device (telephone 120) has captured the line, the process advances to step S1106, and the CPU 101 stops counting of the timer for measuring the message recording response time, which has started counting in step S1007. The measured timer value of the counted message recording response time is temporarily held in the RAM 103. This timer value is an actually measured time until the message recording device (telephone 120) captures the line for the incoming call from the public line. The process advances to step S1107, and the CPU 101 controls the NCU 105 to determine whether a CNG signal has been detected on the line captured by the telephone 120. If it is determined that no CNG signal has been detected, the process advances to step S1108, and the CPU 101 determines, via the NCU 105, whether the connection of the line captured by the telephone 120 has been disconnected. If it is determined that the line connection has not been disconnected, the process returns to step S1107, and it is determined again whether a CNG signal has been detected. If the CPU 101 determines in step S1108 that the line has been disconnected, it is determined that the incoming call has been made for voice communication, thereby terminating the process.

On the other hand, if the CPU 101 determines in step S1107 that a CNG signal has been detected, the process advances to step S1109. In this case, since the incoming call is an incoming call of a facsimile signal, the CPU 101 controls the NCU 105 to perform processing of switching the connection with the public line captured by the telephone 120 to the MFP 100 side. The process advances to step S1110, and the CPU 101 controls the modem 104 to send a DIS signal to the public line, and start facsimile reception processing according to the ITU-T.30 procedure. After the facsimile signal reception processing is performed and completed, the process advances to step S1111, and the CPU 101 saves, in one of the message recording response time histories 207 of the RAM 103, the response time of the message recording device measured and held in step S1106. More specifically, the CPU 101 performs processing of acquiring an ID number from the message recording response time ID 206, saving the response time in one of the message recording response time histories 207, which corresponds to the acquired ID number, and saving the next ID in the message recording response time ID 206. In this way, it is controlled to save, in each message recording response time history 207, only the response time of the message recording device when a facsimile signal is normally received.

The process advances to step S1112, and the CPU 101 recalculates and decides the value in the message recording monitoring timer value 205 of the RAM 103. This processing is performed to update the message recording monitoring timer value 205 using the values in the message recording response time histories 207 since the message recording response time histories 207 have been updated in step S1111. Details of the processing are the same as those of the processing in step S412 described with reference to FIG. 6. The processes in steps S1106 to S1112 of FIG. 11 correspond to those in steps S406 to S412 of FIG. 4 described above.

Figure 12:
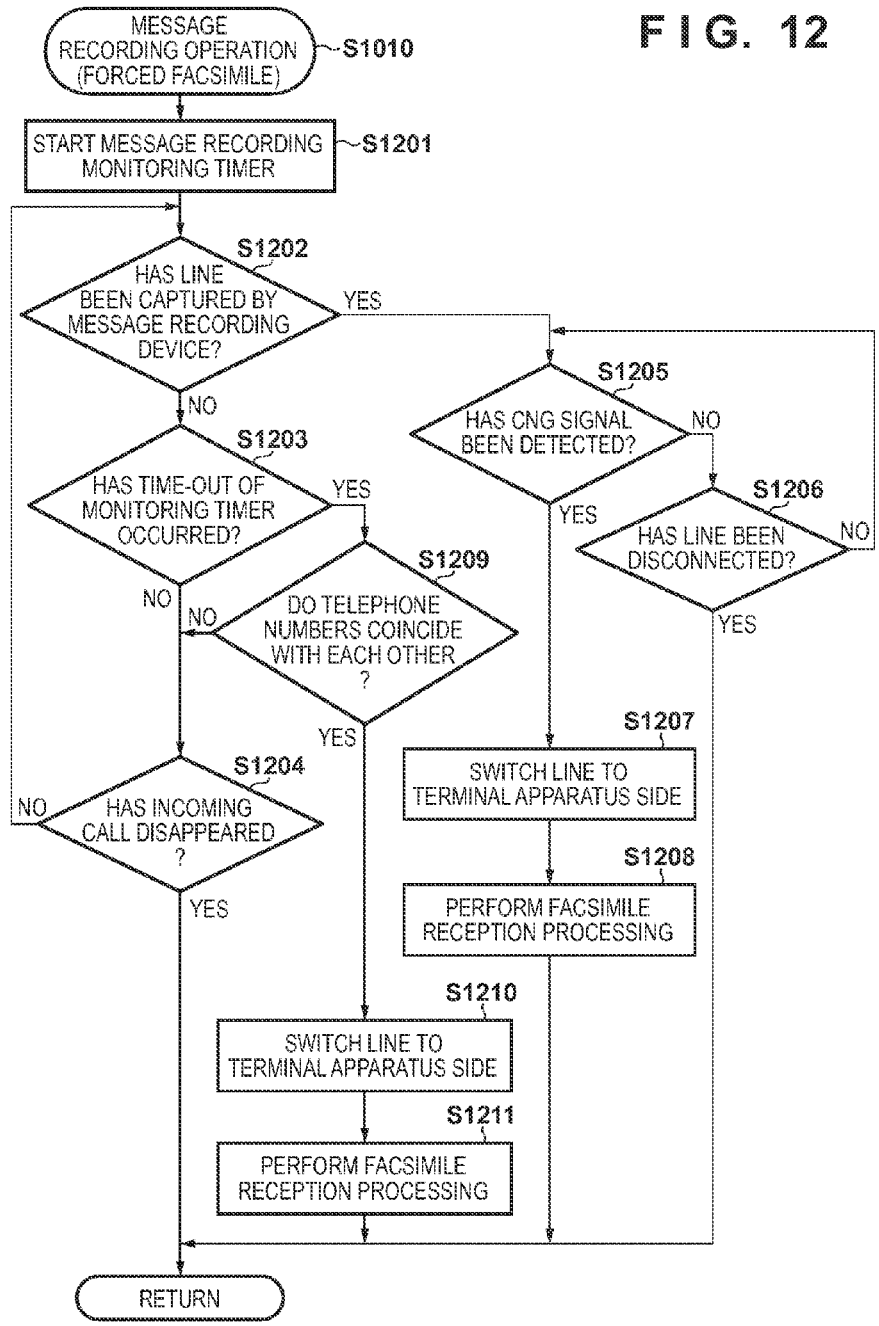
FIG. 12 is a flowchart illustrating message recording operation processing (step S1010) of executing forced facsimile reception processing by the MFP.

FIG. 12 is a flowchart for explaining the message recording operation processing (step S1010 of FIG. 10) in which forced facsimile reception processing is executed, that is performed by the MFP 100 according to the embodiment. Note that the processing of FIG. 12 is almost the same as that shown in the flowchart of FIG. 5 described above except that step S1209 is included.

In step S1201, the CPU 101 starts counting by the message recording monitoring timer. As a timer value at this time, the time value saved in the message recording monitoring timer value 205 of the RAM 103 is used. As described above, the message recording monitoring timer value 205 saves the time value at which facsimile reception processing is forcibly started when the message recording device does not respond within the time. The process advances to step S1202, and the CPU 101 monitors, via the NCU 105, the state of the line connecting the public line and the telephone 120, and determines whether the message recording device (telephone 120) has captured the line. If it is determined that the message recording device (telephone 120) has not captured the line, the process advances to step S1203, and the CPU 101 determines whether a time-out of the message recording monitoring timer which has started counting in step S1201 has occurred. If it is determined that no time-out of the message recording monitoring timer has occurred, the process advances to step S1204, and the CPU 101 determines whether the incoming call signal from the public line has disappeared. If it is determined that the incoming call signal has not disappeared, the process advances to step S1202, and the CPU 101 executes again the processing of confirming whether the telephone 120 has captured the line. If the CPU 101 determines in step S1204 that the incoming call has disappeared, the message recording operation processing for the incoming call ends.

On the other hand, if the CPU 101 determines in step S1202 that the message recording device (telephone 120) has captured the line, the process advances to step S1205, and the CPU 101 controls the NCU 105 to determine whether a CNG signal has been detected on the line captured by the telephone 120. If it is determined that no CNG signal has been detected, the process advances to step S1206, and the CPU 101 determines, via the NCU 105, whether the connection of the line captured by the telephone 120 has been disconnected. If it is determined that the line connection has not been disconnected, the process returns to step S1205, and the CPU 101 confirms again whether a CNG signal has been detected. If the CPU 101 determines in step S1206 that the line has been disconnected, it is determined that the incoming call has been made for voice communication, thereby terminating the process.

If it is determined in step S1205 that a CNG signal has been detected, the incoming call is an incoming call of a facsimile signal, and thus the process advances to step S1207 and the CPU 101 controls the NCU 105 to perform processing of switching the connection with the public line captured by the telephone 120 to the MFP 100 side. The process advances to step S1208, and the CPU 101 controls the modem 104 to send a DIS signal to the public line, and start facsimile signal reception processing according to the ITU-T.30 procedure, thereby terminating the process.

On the other hand, a case in which the CPU 101 determines in step S1203 that a time-out of the message recording monitoring timer has occurred applies to a case in which the MFP waits for the message recording device (telephone 120) to capture the line but the telephone 120 does not capture the line. In this case, therefore, the process advances to step S1209, and the CPU 101 determines whether the telephone number at the time of reception of the immediately preceding incoming call, which has been saved in step S1113 (FIG. 11), coincides with the telephone number at the time of reception of the current incoming call, which has been saved in step S1004 (FIG. 10). If it is determined that the telephone numbers coincide with each other, the incoming call is a repeat incoming call from the apparatus of the same telephone number, and is highly likely to be a repeat incoming call of a facsimile signal. Therefore, the process advances to step S1210, and the CPU 101 forcibly starts facsimile signal reception processing. That is, the CPU 101 controls the NCU 105 to switch the connection with the public line captured by the telephone 120 to the MFP 100 side. The process advances to step S1211, and the CPU 101 controls the modem 104 to send a DIS signal to the public line, and start facsimile signal reception processing according to the ITU-T.30 procedure.

With this processing, if the incoming call from the partner is an incoming call of a facsimile signal, it is possible to correctly receive the facsimile signal, thereby terminating the processing. Note that if the incoming call from the partner is a telephone call, no facsimile signal is received. Therefore, facsimile communication ends according to error processing in the ITU-T.30 procedure, thereby terminating the process.

If the CPU 101 determines in step S1209 that the telephone numbers do not coincide with each other, the incoming call is not a repeat incoming call from the apparatus of the same telephone number. Therefore, the process advances to step S1204, and the CPU 101 determines whether the incoming call has disappeared. In this case, the message recording device captures the line or the MFP waits for the incoming call to disappear.

As described above, according to this embodiment, even if the connected message recording device does not respond to an incoming call from the public line in the message recording mode, it is possible to transit to reception of a facsimile signal for a repeat incoming call within a given time.

By measuring the response time of the connected message recording device, and determining the response time at the time of a normal operation, it is possible to optimize a facsimile signal reception start timing according to the operation of the message recording device.

Furthermore, when the message recording function of the connected message recording device is not correctly executed, the user is notified of the problem, thereby making it possible to notify the user of the occurrence of a problem at an early stage.

If the MFP is connected to the caller ID display line, it determines, based on telephone number information notified from the line, whether an incoming call is a repeat incoming call from the same apparatus. Only when the incoming call is a repeat incoming call from the apparatus of the same telephone number, it is possible to start facsimile signal reception processing. This can cope with retransmission of a facsimile signal from a facsimile transmission source.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041939, filed Mar. 4, 2014, which is hereby incorporated by reference herein in its entirety.

What is claimed is:

1. A communicating apparatus capable of connecting a message recording device and performing facsimile communication, comprising:
   a detection unit configured to detect an incoming call and detect that the incoming call has disappeared;
   a start unit configured to, in a mode in which the message recording device responds to an incoming call, start counting by a repeat incoming call timer in a case where said detection unit detects that the incoming call has disappeared, and start counting by a message recording monitoring timer for counting a message recording response time in a case where said detection unit detects a next incoming call before a time-out of the repeat incoming call timer occurs; and
   a control unit configured to control to start facsimile signal reception processing in a case where the message recording device does not capture a line before a time-out of the message recording monitoring timer started by said start unit occurs, and the incoming call detected by said detection unit has not disappeared.

2. The apparatus according to claim 1, further comprising
   a storage unit configured to, in the mode in which the message recording device responds to an incoming call, store a counted value of a timer for measuring the message recording response time from when the timer starts in response to the incoming call detected by said detection unit until the message recording device responds to the incoming call, and
   an acquisition unit configured to acquire a time value to be set in the message recording monitoring timer based on the counted value stored in said storage unit.

3. The apparatus according to claim 2, wherein said acquisition unit acquires a time value to be set in the message recording monitoring timer based on the counted value of the timer which is stored in said storage unit when a facsimile signal is detected after the message recording device responds to the incoming call.

4. The apparatus according to claim 3, wherein said storage unit stores a plurality of counted values of the timer, and said acquisition unit acquires a time value to be set in the message recording monitoring timer based on an average value of the plurality of counted values.

5. The apparatus according to claim 1, wherein a time-out of the repeat incoming call timer occurs when a predetermined time elapses, and the repeat incoming call timer is used to determine whether a transmission source has performed retransmission.

6. The apparatus according to claim 1, further comprising
   a determination unit configured to, when the message recording device responds to the incoming call detected by said detection unit in the mode in which the message recording device responds to an incoming call, determine whether the incoming call has been received from a facsimile, and a unit configured to, in a case where said determination unit determines that the incoming call has been received from the facsimile, start facsimile reception processing by switching a line connection to the communicating apparatus.

7. The apparatus according to claim 1, further comprising an acquisition unit configured to acquire telephone number information of the incoming call detected by said detection unit in a caller ID display service, wherein in a case where the telephone number information of the incoming call acquired by said acquisition unit coincides with telephone number information of the incoming call immediately precedingly acquired by said acquisition unit, said control unit controls to start facsimile signal reception processing.

8. The apparatus according to claim 1, further comprising a unit configured to set a mode in which the message recording device is monitored, wherein in a case where the mode is set, said start unit and said control unit operate.

9. The apparatus according to claim 8, further comprising a warning unit configured to issue a warning, in a case where the mode in which the message recording device is monitored has been set, in a case where said detection unit detects an incoming call and the message recording device does not respond to the incoming call before said detection unit detects that the incoming call has disappeared.

10. A control method for a communicating apparatus capable of connecting a message recording device and performing facsimile communication, comprising:

a detection step of detecting an incoming call and detecting that the incoming call has disappeared;

a start step of, in a mode in which the message recording device responds to an incoming call, starting counting by a repeat incoming call timer in a case where it is detected in the detection step that the incoming call has disappeared, and starting counting by a message recording monitoring timer for counting a message recording response time in a case where a next incoming call is detected in the detection step before a time-out of the repeat incoming call timer occurs; and a control step of controlling to start facsimile signal reception processing in a case where the message recording device does not capture a line before a time-out of the message recording monitoring timer started in the start step occurs, and the incoming call detected in the detection step has not disappeared.

11. A non-transitory computer-readable storage medium storing a program for causing a computer to execute each step of a control method for a communicating apparatus defined in claim 10.

* * * * *